United States Patent [19]
Saeda et al.

[11] Patent Number: 5,214,980
[45] Date of Patent: Jun. 1, 1993

[54] WORK ROTATING APPARATUS FOR LASER MACHINING HAVING IMPROVED TILT ANGLE SETTING MECHANISM

[75] Inventors: Koichi Saeda, Higashiosaka; Shunji Sakura, Kyoto; Tatsuya Hirai, Itami; Yuko Sanada, Daito, all of Japan

[73] Assignee: Tsubakimoto ChainCo., Osaka, Japan

[21] Appl. No.: 891,880

[22] Filed: Jun. 1, 1992

[30] Foreign Application Priority Data

May 30, 1991 [JP] Japan .................. 3-48256[U]

[51] Int. Cl.⁵ .................................................. G05G 5/06
[52] U.S. Cl. ........................................ 74/527; 74/528
[58] Field of Search ............... 74/527, 523, 525, 528, 74/813 R, 813 L; 279/5; 409/224

[56] References Cited

U.S. PATENT DOCUMENTS

| | | | |
|---|---|---|---|
| 2,445,016 | 7/1948 | Bentley | 29/288 |
| 2,691,205 | 10/1954 | Bechler | 29/40 |
| 3,115,051 | 12/1963 | Burg | 77/25 |
| 3,525,272 | 8/1970 | Olson | 74/528 |
| 3,817,361 | 6/1974 | Lundqvist | 74/528 X |
| 4,222,474 | 9/1980 | Choudhury et al. | 74/528 X |
| 4,502,457 | 3/1985 | Marron | |
| 4,733,214 | 3/1988 | Andresen | 74/523 |
| 4,744,265 | 5/1988 | Nagano | 74/527 X |
| 4,949,830 | 8/1990 | Kemner et al. | 74/523 |
| 5,134,898 | 8/1992 | Anderson | 74/527 |

Primary Examiner—Vinh T. Luong
Attorney, Agent, or Firm—Howson & Howson

[57] ABSTRACT

A work rotating apparatus, for use in conjunction with a laser machine tool, comprises a frame, a rotatable shaft mounted on the frame for rotation on an axis, and a work mounting chuck supported by the shaft. A first disc is fixed to and rotates with the shaft. A second, stationary, disc is mounted on the frame in opposed relation to the rotatable disc. Recesses, formed on one of the discs, are positioned in circumferentially spaced relationship to one another, in a circle centered on the axis of the rotatable shaft. A spring-loaded ball detent is provided on the other disc for engagement with selected ones of the recesses. The work can be easily moved to each of several preset angles of inclination. A lock lever is provided to lock the shaft not only at the preset positions, but at any other desired position, so that any desired angle of inclination of the work can be achieved.

1 Claim, 6 Drawing Sheets

WORK ROTATING APPARATUS FOR LASER MACHINING HAVING IMPROVED TILT ANGLE SETTING MECHANISM

BRIEF SUMMARY OF THE INVENTION

This invention relates to rotating work supports of the kind used to hold and rotate a workpiece in a laser machining operation. It relates more particularly to an improved mechanism for setting the angle at which the axis of rotation of the workpiece is tilted.

In conventional work supports for laser machining, the workpiece is held in a clamp or chuck and rotated while the laser remains stationary. The axis of rotation of the workpiece can be tilted. In one category of work support, the angle of tilt is set manually by a lever which is spring-urged into engagement with a retaining hole in a fixed element. The retaining hole is one of a number of retaining holes provided at appropriate positions in the fixed element In order to adjust the tilt angle, the lever is pulled out of the retaining hole in which it is engaged, the lever is then moved to tilt the workpiece support, until the end of the lever is in register with another retaining hole. The lever is then allowed to be pressed by the spring into the last-mentioned hole so that the axis of rotation of the workpiece is maintained at the new angle of tilt.

A problem with the conventional manually tilted apparatus is that it is troublesome to pull the lever out of the retaining holes and insert it into other retaining holes.

The invention addresses the above-mentioned problem by the provision of a novel angle setting mechanism. The work rotating apparatus comprises a frame, a rotatable shaft mounted on the frame for rotation on an axis, and work mounting means supported by the shaft. A disc is provided which is integral with the shaft and rotatable therewith about the axis of rotation of the shaft. A stationary disc is mounted on said frame in opposed relation to the rotatable disc, and a plurality of recesses is formed on one of the discs. These recesses are positioned in circumferentially spaced relationship to one another, in a circle centered on the axis of the rotatable shaft. A ball detent means is provided on the other disc for engagement with selected ones of the recesses.

When a workpiece is mounted on the work mounting means and the rotatable shaft is rotated, the workpiece tilts with respect to the laser processing machine. At this time, the rotating disc, which is integral with the rotatable shaft, rotates with respect to the stationary disc. As the rotating disc rotates, the ball detent, which is on one of the discs, moves relative to the other disc, and then falls into a recess and is engaged therein.

Upon engagement of the ball with the recess, the rotatable shaft is held against rotation, and the workpiece assumes an inclined state at a first preset angle. With the workpiece in the tilted condition, it is rotated by the workpiece mount, and laser machining is carried out.

If the workpiece is to be tilted further from the first preset inclined position, the rotatable shaft is again rotated, thereby causing the ball to be cammed out of the recess and to be engaged with a next recess. The work is then inclined at the next preset angle and further laser machining is carried out.

This mechanism enables the work mounting means to be tilted manually, and held at any selected one of a plurality of predetermined inclinations by the engagement of the ball detent means with a selected recess. It is no longer necessary to pull a lever out of one retaining hole and engage it with another retaining hole.

Further objects, details and advantages of the invention will be apparent from the following detailed description, when read in conjunction with the drawings.

DETAILED DESCRIPTION

Figure 1:
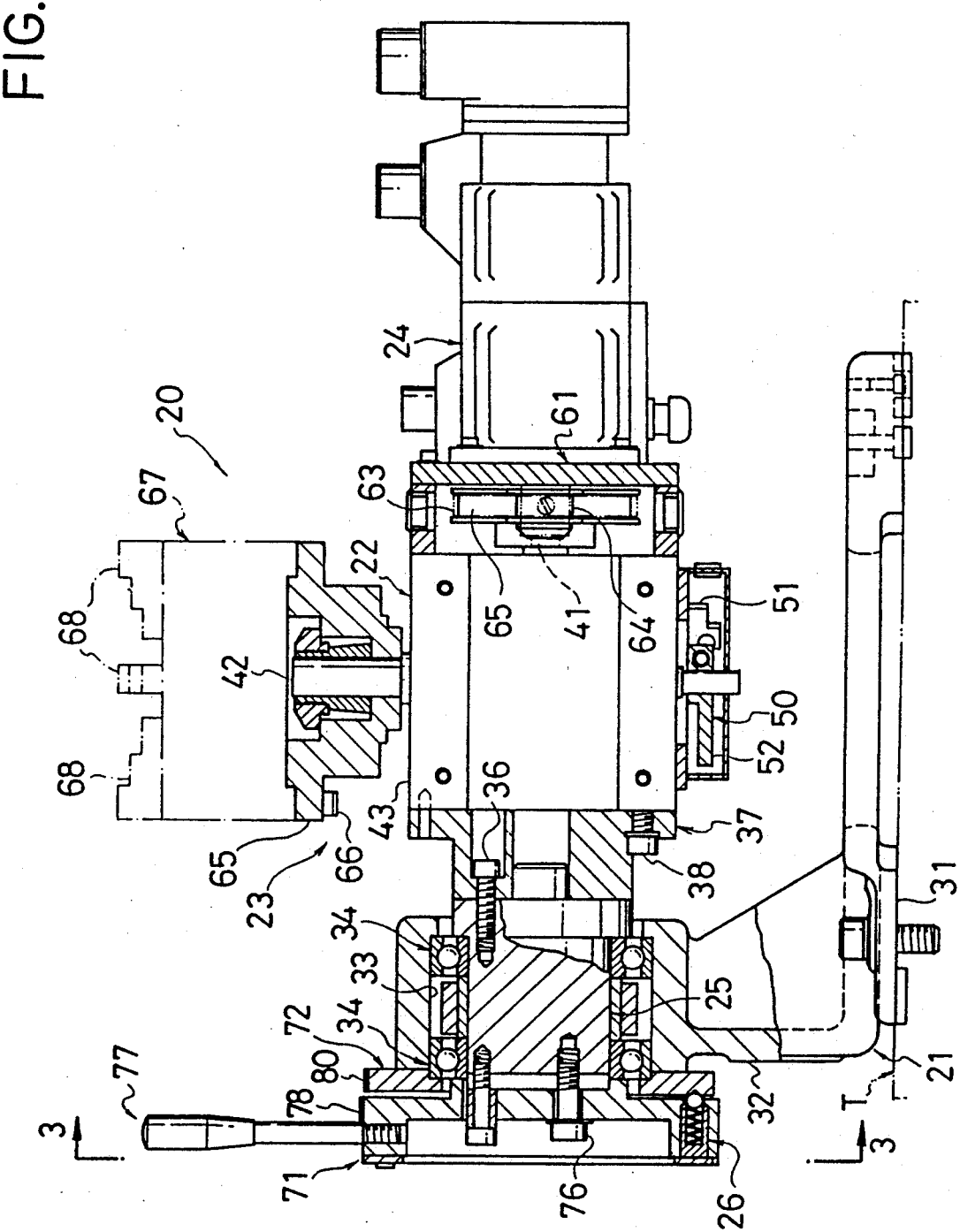
FIG. 1 is a partially sectional front elevational view of a work rotating apparatus including a tilt angle setting mechanism according to a first embodiment of the invention.

Referring to FIG. 1, a work rotating apparatus generally indicated by reference numeral 20, is mounted on a table T of a laser machine tool (not shown). Its purpose is to hold and rotate a workpiece during machining by a stationary laser. The work rotating apparatus 20 has a frame 21, a right angle, work rotating speed reduction unit 22, a workpiece mount 23, a servomotor 24, a manually rotatable shaft 25, and a tilt angle setting mechanism 26.

Frame 21 is a generally L-shaped frame, provided with a mounting face 31 for mounting on table T. Manually rotatable shaft 25 is rotatably supported by a pair of bearings 34 in a hole 33 formed in an upstanding portion 32 of frame 21.

Figure 2:
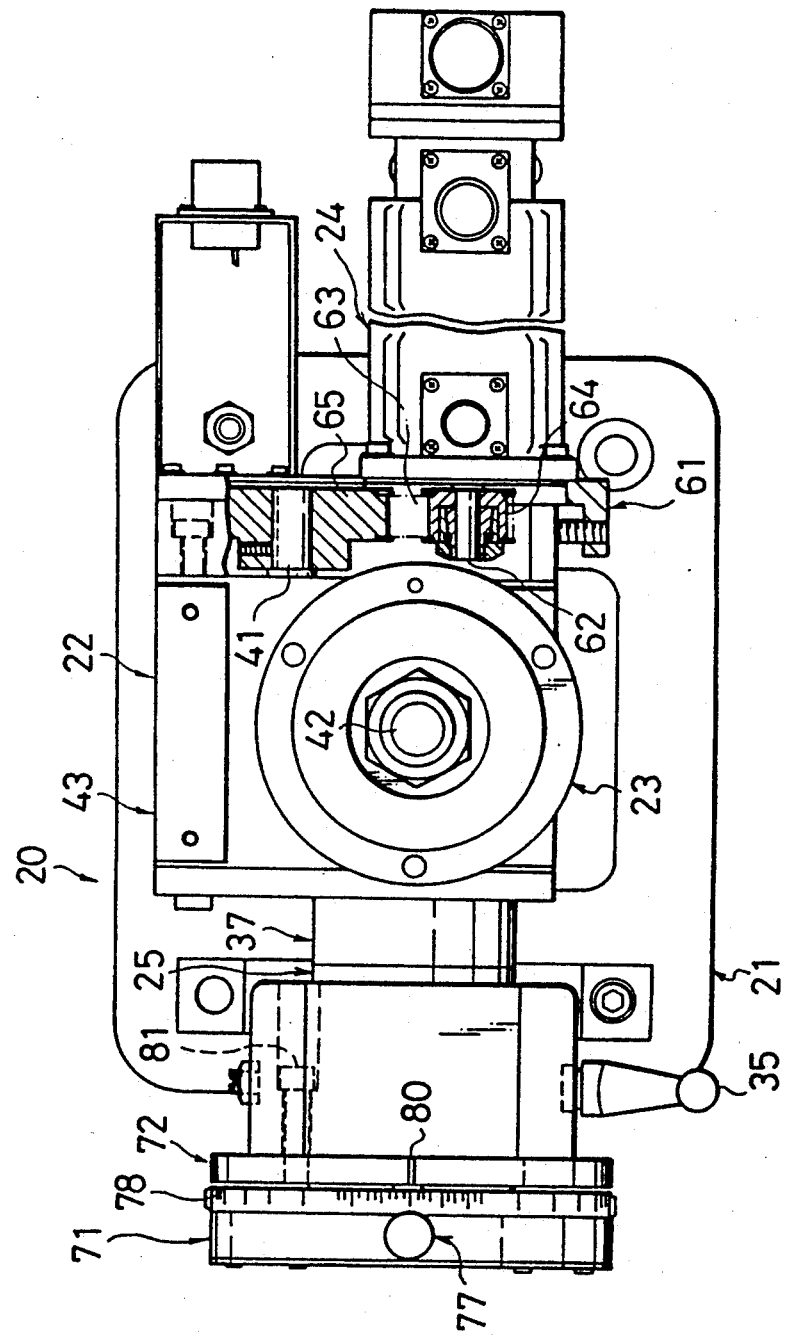
FIG. 2 is a partially sectional top plan view of the work rotating apparatus of FIG. 1.
Figure 3:
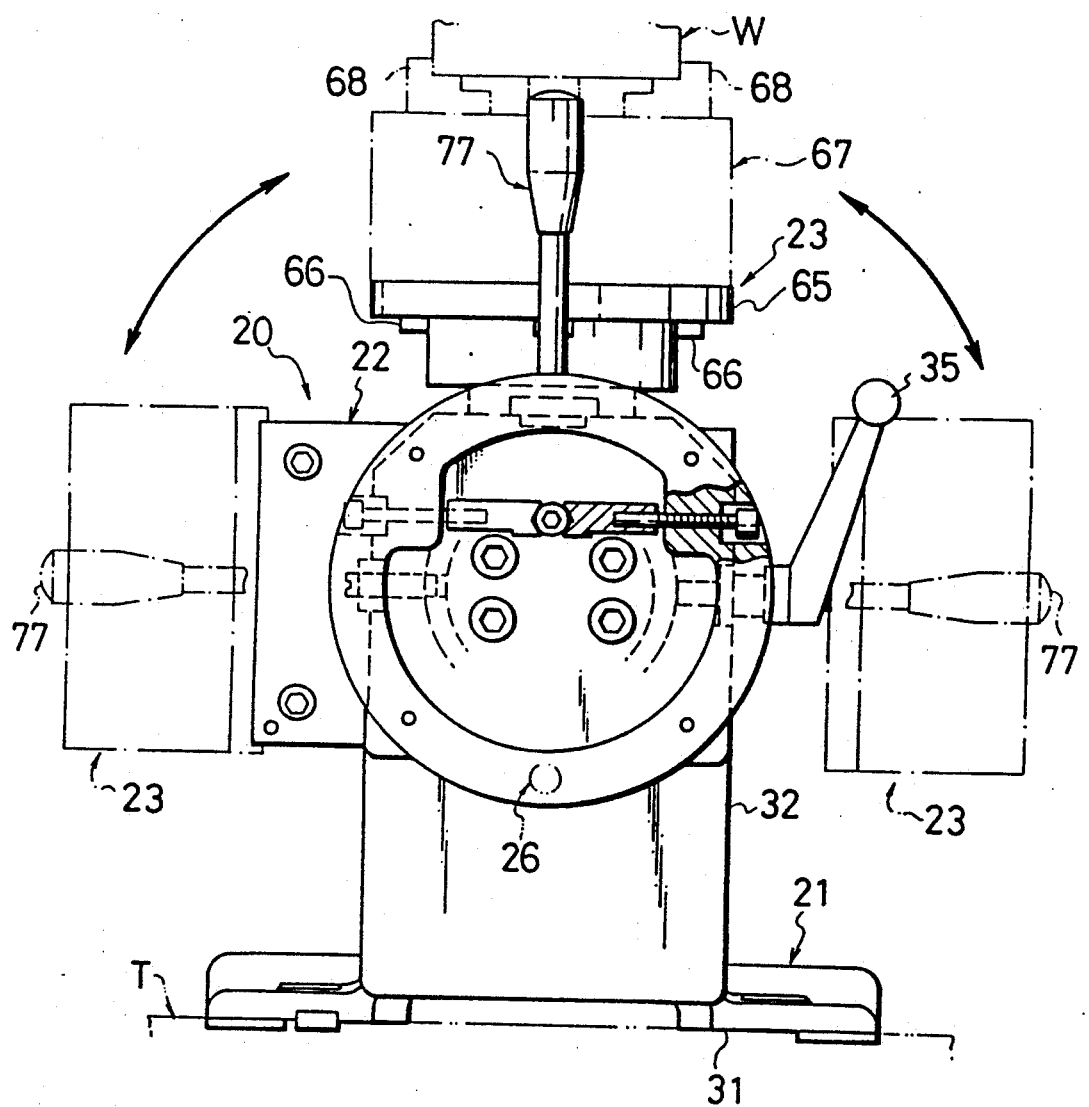
FIG. 3 is a sectional view taken on plane 3—3 in FIG. 1.
Figure 4:
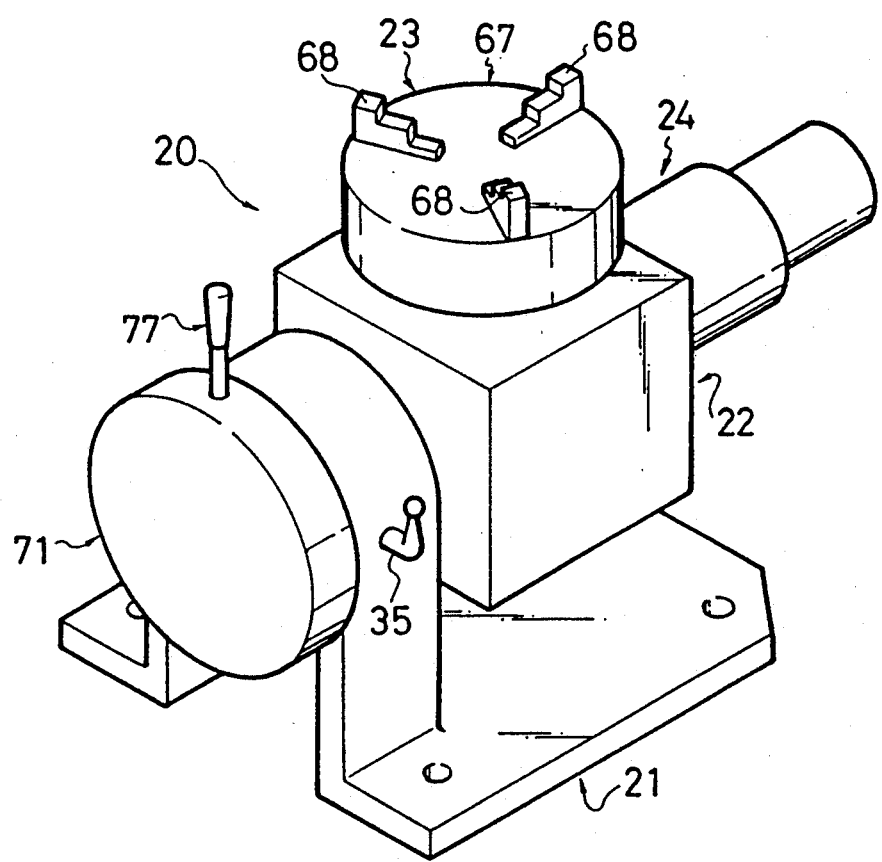
FIG. 4 is a schematic perspective view of the work rotating apparatus.

As shown in FIGS. 2, 3 and 4, upstanding portion 32 of the frame 21 is provided with a lock lever 35 for locking the manually rotatable shaft 25 to frame 21.

As shown in FIG. 1, a bracket 37 is secured to the rightmost end of shaft 25 by bolts 36. Work rotating speed reduction unit 22 is secured to the rightmost face of the bracket 37 by bolts 38.

The purpose of work rotating speed reduction unit 22 is to rotate a workpiece W (FIG. 3). The right angle speed reducing mechanism is located within, and supported by, an aluminum housing 43 with the axes of its input shaft 41 and its output shaft 42 in crossing relationship to each other. The axis of output shaft 42 intersects the axis of manual rotatable shaft 25 perpendicularly.

In the reduction unit 22, a worm (not shown), mounted on and driven by input shaft 41, comes into mesh with plural needle rollers (not shown) which project radially from a cam follower mounted on output shaft 42 so that output shaft 42 rotates at a fraction of the speed of input shaft 41. To avoid backlash of the output shaft 42, input shaft 41 is disposed in proximity to output shaft 42 so that the inter-shaft distance is slightly shorter than the inter-shaft distance for normal meshing.

At the lower end of output shaft 42, there is provided an origin setting mechanism 50, as shown in FIG. 1. The origin setting mechanism 50 sets a rotational origin position for the workpiece W and detects overrotation of the work mount 23. The origin setting mechanism comprises a proximity switch 51 provided in housing 43 and a switch actuating member 52 on the output shaft 42.

A side plate 61, supporting servomotor 24, is attached to housing 43 of the work rotating speed reduction unit 22, as shown in FIG. 2. Output shaft 62 of servomotor 24 is connected to input shaft 41 of work rotating speed reduction unit 22 through a toothed belt 63 and aluminum pulleys 64, 65 which are positioned between side plate 61 and speed reduction housing 43. Belt 63 and pulleys 64 and 65 have teeth (not shown) which are formed for mutual engagement in close contact. The close contact of the teeth of the belt with the teeth of the pulleys, when coming into mesh with each other, substantially prevents backlash from occurring between the servomotor and the work rotating speed reduction unit.

The work mount 23, as shown in FIG. 1, comprises a chuck support 65, mounted on the output shaft 42 of the work rotating speed reduction unit 22 and a conventional chuck 67, mounted on support 65 by bolt 66. The chuck 67, as shown in FIG. 4, is typically a self-centering three-jaw chuck having workpiece grasping jaws 68. Other types of workpiece grasping mechanisms can be used, of course, for example four-jaw chucks with independently movable jaws.

Work tilt angle setting mechanism 26 is provided between a side face of the upstanding portion 32 of frame 21 and the leftmost end of manually rotatable shaft 25. The work tilt angle setting mechanism is used to set the tilting angle, of the axis of rotation of the workpiece which is held by work mount 23.

The work tilt angle setting mechanism 26 has a rotating angle graduation disc 71, and a stationary angle indexing disc 72. Stationary disc 72 is provided with a plurality of angle indexing recesses 73, one such recess being shown in FIG. 5. A detent ball 74 carried by rotatable disc 71 is urged toward disc 72 by a coil spring 75.

Referring again to FIG. 1, angle graduation disc 71 is attached to the leftmost end of manually rotatable shaft 25, and is provided with a radially extending lever 77. Angle graduations 78 are provided on the periphery of disc 71.

Figure 5:
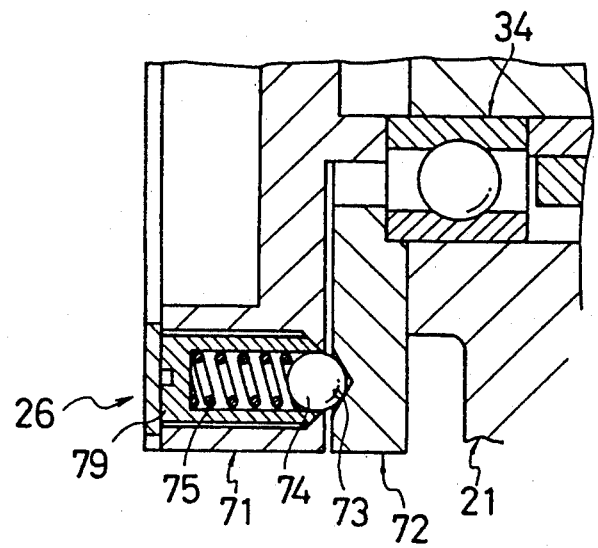
FIG. 5 is a detailed sectional view of the tilt angle setting mechanism.

As shown in FIG. 5, ball 74 is held in a ball holding member 79 which is threaded into angle graduation disc 71. The ball and is urged against the face of angle indexing disc 72 by coil spring 75.

Angle indexing disc 72 is fixed to a side face of frame 21 by bolts 81, one of which is shown in FIG. 2. Disc 72 it has an indexing groove 80, which can be read against the graduations on disc 71 for indication of the inclination of the axis of rotation of the workpiece.

Recesses 73 which are conical recesses, provided at intervals of typically 45 degrees on an imaginary circle centered on the axis of manually rotatable shaft 25.

In the operation of the embodiment just described, first, as shown in FIG. 3, a workpiece W is grasped by chuck 67 of work mount 23. At this time, lock lever 35 is locked, and the axis of shaft 42 is vertical, so that the upper face of chuck 67 is horizontal. When the axis of shaft 42 is brought to the vertical condition, ball 74 of the tilt angle setting mechanism 26 falls into a recess 73 in disc 72. The falling of the ball into the recess can be felt by the operator through lever 77. Furthermore, the ball cooperates with the conical recess in such a way as to cam the manually rotatable shaft 25 automatically to the proper position. When the axis of work rotating shaft 42 is vertical, indexing groove 80 on disc 72 is directly opposite a "0°" mark in the angle graduations 78.

The lock lever 35 is tilted to unlock the manual rotatable shaft 25, to permit rotation of shaft 25. Then, shaft 25 is rotated manually by lever 77, so that reduction unit 22 tilts together with the work mount and workpiece W.

At this time, angle graduation disc 71 rotates, integrally with the manual rotatable shaft 25, while angle indexing disc 72 remains stationary. With the rotation of the angle graduation disc 71, the ball 74 moves, against the biasing force of coil spring 75, out of the recess in which it was located, and falls into a next recess on the imaginary circle on disc 72.

Once ball 74 falls into the next recess, the rotation of the shaft 25 is restricted and work mount 23, together with workpiece W, are held in an inclined condition at a preset angle, e.g. 45°. At this time, groove 80 on disc 72 is directly opposite a "45°" mark in angle graduations 78.

If the workpiece W is to be further tilted from its inclined position, lock lever 35 is operated to free manually rotatable shaft 25, and shaft 25 is again rotated until ball 74 falls into the next recess for engagement therein, whereby the work mount and workpiece W are held, for example, in a 90° position, as indicated by the broken line image of work mount 23 in FIG. 3. At this time, groove 80 on disc 72 is directly opposite a "90°" mark in angle graduations 78.

After work mount 23 is tilted to a preset angle, manually rotatable shaft 25 is locked to frame 21, by operation of lock lever 35, to fix the work mount 23.

When the work mount 23 is to be tilted at an angle other than a preset angle corresponding to a recess 73, the operator tilts the work mount while observing the angle indications provided by angle graduations 78 and indexing groove 80. When the work mount reaches the desired inclination, it is locked by means of the lock lever 35, provided that ball 74 is not engaged with a recess 73.

Next, upon operation of the servomotor 24, the rotating force of the motor is transmitted to output shaft 42 through output shaft 62 of motor 24, pulley 64, toothed belt 63, pulley 65 and input shaft 41 of work rotating speed reduction unit 22, so that the work mount 23 rotates. Since the rotating speed of the servomotor 24 is reduced by reduction unit 22, the work mount 23 is rotated at a speed lower than the rotational speed of servomotor 24. It will be apparent that the axis of rotation of the workpiece can be inclined to any desired angle within a wide range on both sides of the vertical.

Figure 6:
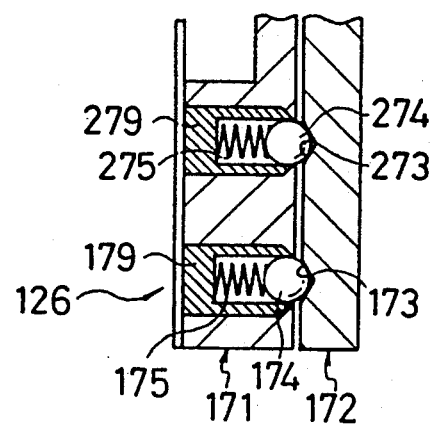
FIG. 6 is a detailed sectional view of a tilt angle setting mechanism according to another embodiment of the invention.
Figure 7:
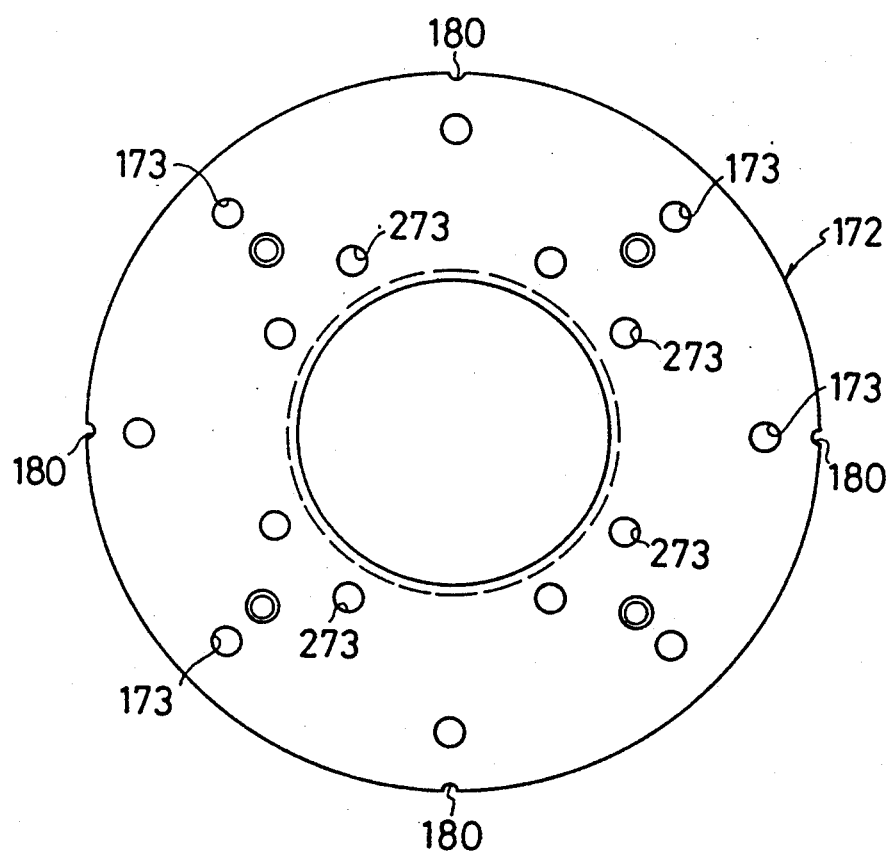
FIG. 7 is a side view of an angle indexing disc used in the tilt angle setting mechanism of FIG. 6.

Although recesses 73 of the tilt angle setting mechanism 26 are provided at 45° intervals on angle indexing disc 72, other arrangements of recesses can be used to achieve desired preset angular positions. For example, in the second embodiment of the invention, as shown in FIG. 7, disc 172 has plural recesses 273 positioned on an inner imaginary circle, and plural recesses 173 positioned on an outer imaginary circle. The recesses in the outer circle are located at 45° intervals. The recesses in the inner circle, together with the 0°, 90°, 180° and 270° recesses in the outer circle, provide for positioning of the work at 30° intervals. In the work tilt angle setting mechanism 126, as shown in FIG. 6, two balls 174 and 274 are provided in angle graduation plate 171 respectively in ball holding members 179 and 279, and urged outward against disc 172 by coil springs 175 and 275 respectively. Ball 174 cooperates with recesses 173, while ball 274 cooperates with recesses 273.

As shown in FIG. 7, preferably, four indexing grooves 180 are formed at intervals of 90° in the outer periphery of disc 172.

Since the tilt angle setting mechanism of the invention is constructed in such a manner that a workpiece is positioned at a preset angle by engagement of a ball with a recess, the inclination of the work can be set to the preset angle easily and accurately. The lock lever 35 locks the manually rotatable shaft not only at the preset positions, but also at any other desired position, so that any desired angle of inclination of the work can be achieved.

Various other modifications can be made to the apparatus described. For example, the detent balls and their holders and springs can be provided in the disc which is fixed to the frame, while the ball-receiving recesses can be provided in the rotating disc. The balls and recesses, while preferably provided on radial faces of their respective discs, can be provided alternatively on radial inward or outward facing surfaces, or on surfaces inclined with respect to the axis of rotation of the manually rotatable shaft. Still further modifications can be made to the apparatus described without departing from the scope of the invention as defined in the following claim.

We claim:

1. A work rotating apparatus for laser machining, including:
    work mounting means;
    a frame;
    a rotatable shaft mounted on said frame for rotation on an axis, said work mounting means being supported by said shaft;
    a disc integral with said shaft and rotatable therewith about said axis;
    a stationary disc mounted on said frame in opposed relation to said rotatable disc;
    a plurality of conical recesses formed on one of said discs, said recesses being positioned in circumferentially spaced relationship to one another, in a circle centered on the axis of said rotatable shaft; and
    ball detent means provided on the other disc for engagement with selected ones of said recesses, said ball detent means comprising balls movable in and out of said recesses, and means comprising coiled springs for biasing said balls toward said recesses;
    whereby the work mounting means can be tilted manually, and held at any selected one of a plurality of predetermined tilt angles by the engagement of said ball detent means with a conical recess in said one of said discs.

* * * * *